July 17, 1962 W. G. HORTON 3,044,436
INDICATORS AND INDICATING SYSTEMS
Filed Dec. 28, 1959 3 Sheets-Sheet 1

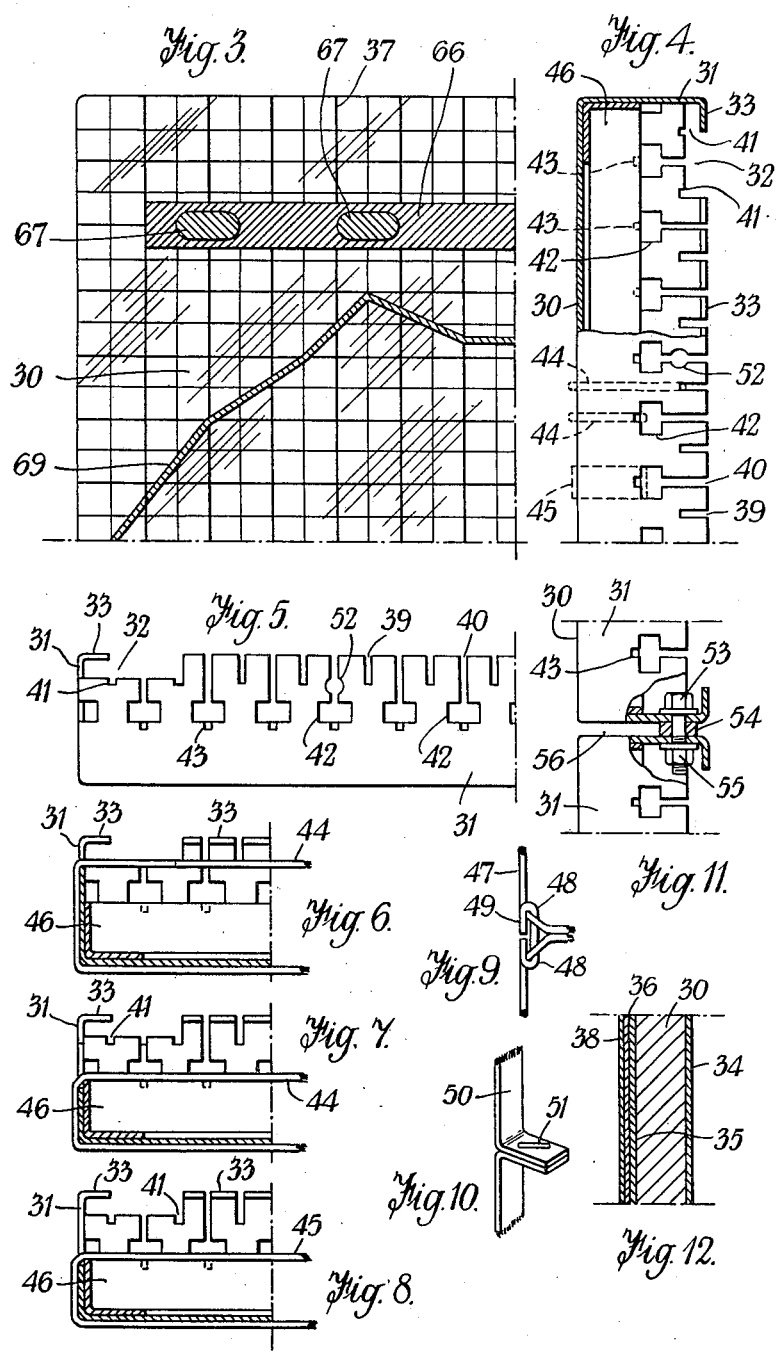

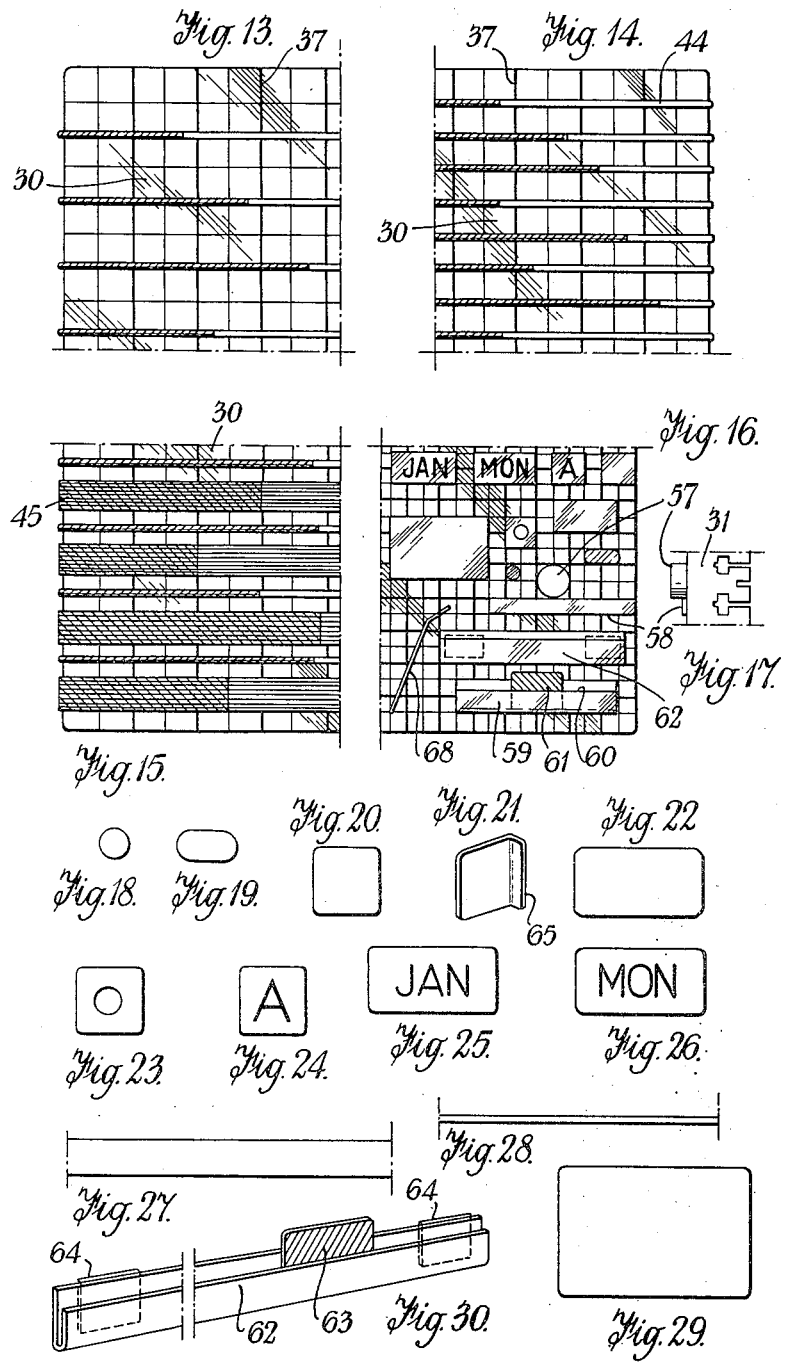

ular form, for example ten inches by twenty inches,
United States Patent Office 3,044,436
Patented July 17, 1962

3,044,436
INDICATORS AND INDICATING SYSTEMS
William Gray Horton, 36 Gloucester Square,
London W. 2, England
Filed Dec. 28, 1959, Ser. No. 862,365
Claims priority, application Great Britain June 24, 1959
2 Claims. (Cl. 116—135)

This invention relates to indicators and indicating systems of the type including a rectangular metal plate with a rearwardly extending flange on each bounding edge thereof, and has for its object to provide such flanged plates of such form that they are more generally useful than hitherto.

As hitherto constructed, such a flanged plate, when utilised with stretchable spaced parallel endless cords or bands, which pass completely around the plate to leave portions visible on the display surface thereof, had the rear portion of the cords projecting from the rear edges of the flanges, and as a consequence these projecting portions were liable to bind against the surface of a wall or the like on which the plate was suspended, and hinder or prevent an accurate adjustment of the cords or bands on the display surface.

A primary object of the present invention is to provide such plates of a form that the above objection is overcome, such plates moreover being adapted for use in addition with indicating means of other forms.

The invention has for a further object to form the display surface of such plates with integral grid-like markings of uniform character for the accurate and varied positioning of such other indicating means, as well as for the co-operation therewith of endless cords and bands.

A still further object of the invention is to provide such metal display plates, having grid-like markings on the display surfaces, for co-operating with stretchable endless cords and bands, as well as other known forms of indicators for mounting or disposition on the display surface of the plates, so that the whole can be utilised for the building-up of charts, graphs, tables and the like of divers forms.

According to the present invention, a rectangular metal plate with rearwardly extending flanges at each of its edges, of the type as above set forth, as the rear edges of the flanges formed with uniformly spaced slots having a width equal to or slightly greater than the width of the cords or bands, and a depth greater than the thickness of the cords or bands.

By this means, cords or bands can encircle the plate and at the rear be located in said slots and as a consequence always be clear of the wall or other surface supporting the plate.

The grid-like pattern of lines on the display surface comprises uniformly spaced rectilinear lines, parallel to the edges of the plate and crossing at right angles, and preferably is a silk-screen "printing" on a white fire-enamelled surface of the plate and with an oven-fired over-coating of transparent lacquer.

Moreover, the spacing between the lines preferably equals the spacing between adjacent slots in the flanges.

In order that the invention may be better understood, it will now be described with reference to the accompanying drawings which are given by way of example only and in which:

FIG. 3 shows a similar view to FIG. 1 but of the left-hand upper corner thereof, with additions, and to a larger scale.

FIG. 4 is a side view of FIG. 3, partly in section.

FIG. 5 is a plan of FIG. 3.

FIGS. 6, 7 and 8 show fragmentary sectional plan views of the left-hand side portion of FIGS. 3 and 4 taken in different positions.

FIG. 9 shows a perspective diagram of one method of joining together the ends of a stretchable cord.

FIG. 10 shows a similar view of a method of joining the ends of a stretchable band.

FIG. 11 shows a fragmentary side elevation of one method of connecting together two plates such as shown in FIG. 1.

FIG. 12 shows to a highly enlarged scale a cross section through the metal of the plate shown in FIG. 1.

FIG. 13 shows a similar view to FIG. 3, with portions of endless elastic cords in position.

FIG. 14 shows a view of the right-hand upper corner of a plate such as shown in FIG. 1, with another arrangement of endless elastic cords in position.

FIG. 15 shows a view of the left-hand lower corner of a plate such as shown in FIG. 1, with an arrangement of endless elastic cords and endless elastic bands in position.

FIG. 16 shows a similar view to FIG. 15, but of the right hand lower corner of the plate and to a smaller scale with various indicating means mounted thereon.

FIG. 17 shows a side elevation of a portion of FIG. 16.

FIGS. 18 to 29 show elevations and a perspective view, of indicating means in sheet form adapted to be attached by pressure-sensitive adhesive to the surface of a plate such as shown in FIGS. 1, 3, 13, 14, 15 and 16, and FIG. 30 shows a perspective view of another indicating means for mounting upon display plates according to the invention.

Figure 1:
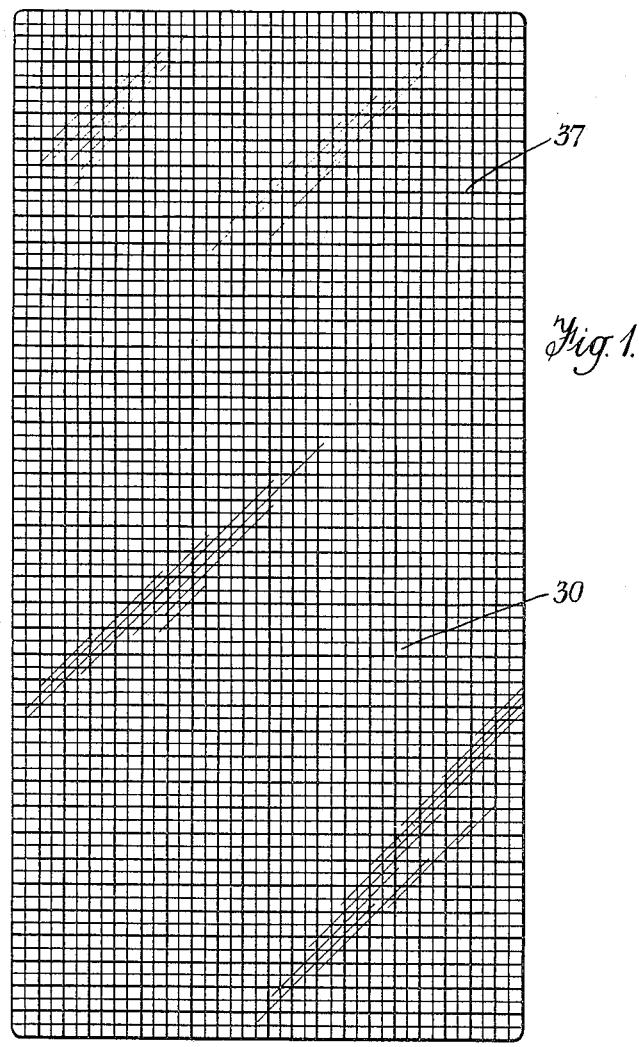
FIG. 1 is an elevation and FIG. 2 a plan of one embodiment of a metal display plate constructed according to the invention.

The metal display plate 30 shown in FIG. 1 is of rectangular form, for example ten inches by twenty inches, although it could be of any other suitable dimension. Each edge of the plate is bent round into an integral flange one of which, 31, is shown in full in FIG. 2, which figure also shows portions of the other flanges 31 at the sides. Each of the flanges 31 is cut away at the two ends at 32 for part of its depth and the remaining portion is bent around rearwardly into an auxiliary flange 33, two of which show in FIG. 2. By this means the plate 30 can be suspended by any of its edges from a horizontally mounted flanged rail fixed to a wall.

The structure thus far particularly described is known in itself.

According to the present invention, however, the rear edge of each of the flanges 31 and the integral auxiliary flange 32 is formed with uniformly spaced slots for the mounting of a plurality of spaced parallel stretchable endless cords or bands, adapted to be located in the slots so as not to project to the rear of the plate and to pass completely around the plate.

The uniform spacing of the cords and bands can be as desired, but it is preferred that this spacing should be co-related with a desired line ruling or marking on the display surface of the plate 30.

In the present instance, the plate 30 (FIG. 12) and its integral flanges have a coating of white enamel 34 on the rear and 35 on the front, and these coatings are oven-fired thereon. Afterwards the outer surface has printed thereon by silk-screen printing, a "printing" 36 of a grid-like arrangement of rectilinear lines 37 crossing each other at right angles. These lines are uniformly spaced and come parallel with the vertical and horizontal edges of the plate 30. For example, they have a uniform spacing of one quarter of an inch, with every second line thickened to form the pattern as indicated in FIGS. 1 and 3.

This silk-screen "printing" 36 is finally covered with a coating of lacquer 38 which is stove-fired.

In this manner the display surface of the plate 30 has a permanent grid-like arrangement of lines thereon to form the background for the mounting of various indicating means as hereafter described, and to be co-related with slots in the flanges. Preferably, the printing is of a light-blue colour so that as a background it is normally non-reproducible when photographed, thus conforming to various Government and other specifications in this respect. However, it should be realised that the printing could be of a different colour and in some cases the printing could be in more than a single colour.

In the arrangement of slots shown in the drawings, the flanges have thereon alternate narrow slots 39 and 40 spaced one quarter of an inch apart and coming in the same plane as the horizontal and vertical planes which include the line markings 37 on the surface of the plate 30. All the slots 39 extend completely through the auxiliary flanges 33 and down the flanges 31 about one quarter of an inch. At the corners the major length of the slots 39 is cut away, but this leaves notches 41 which are sufficient for the purpose. The narrow slots 40 have greater length than the slots 39 and open in a symmetrical manner into rectangular apertures 42 having a width of about one quarter of an inch and a depth of, say, five thirty-seconds of an inch. The slots 40 are continued through the apertures 42 and terminate in notches 43.

In this manner endless stretchable cords 44 can be placed around the flanged plate 30 to lie in all of the slots 39 and 40, or as many as may be desired; for example, as shown in FIG. 14. Those which come within the slots 39, an example of which is shown by the uppermost dotted cord 44 in FIG. 4, extend around the plate in a manner indicated at FIG. 6 which is a section through this uppermost dotted cord 44.

Those which pass through the slot 40 and are accommodated in the notch-like portions 43 thereof, an example of which is shown by the lower dotted cord 44 in FIG. 4, extend around the plate in a manner indicated at FIG. 7 which is a section through this lower dotted cord 44.

The rectangular apertures 42 are to accommodate endless stretchable bands 45. These are slightly less than one quarter of an inch wide and as a consequence they come at half-inch spacings. Some are shown in FIG. 15 alternating with cords 44 and an example is shown dotted in FIG. 4 together with a corresponding section in FIG. 8.

For the purpose of acting as a display surface, the plate 30 can be made of a light-gauge metal, but as this renders the flanges 31 and 33 to some extent weak and as, moreover, this weakness is enhanced by the slotting, a reinforcing angle member 46 is welded into position at the rear of the plate and at the bends of the plate with the flange. This, of course, is before the whole is dipped for enamelling.

This reinforcement extends up to the inner edges of the apertures 42 so that any tendency the thin bands 45 might have to enter the notches 43, is prevented, whilst these notches still remain to effect their function of locating the cords 44 in the lower position shown in FIG. 4.

The endless stretchable cords and bands are of the type in which one half is of one colour which contrasts with the display surface of the plate 30, and of another colour which may match the display plate. Thus, by pulling on the cord by the thumb and fingers of one hand, or by a tweezer-like tool, the amount of the colour contrasting portion brought on to the display surface can be varied, and this can form the necessary indicator or contribute to the formation of a graph.

In FIGS. 13, 14 and 15 the contrasting colouring of the said cords and bands has been illustrated.

In FIG. 9, a simple join between the ends of a cord to make it endless, is illustrated. In this figure, 47 is the cord the ends of which are clamped at the bends 48 of a hard-wire staple 49.

FIG. 10 shows a method of connecting the ends of a stretchable band and in this figure 50 is the band the ends of which are fastened together by a staple 51. It will, of course be appreciated that these joins in the cords and bands are disposed at the rear of the plate 30.

In order that the cords and bands may be moved freely in the case where two plates 30 are fastened together, means are provided whereby a space is left between the connected plates to allow the free passage of the said cords or bands.

Figure 2:
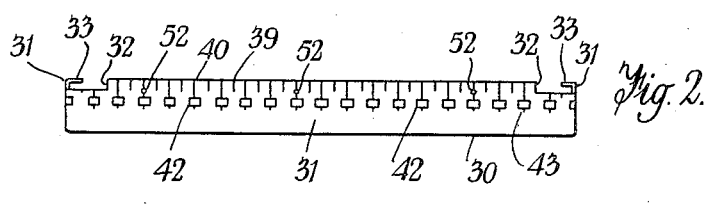

As will be seen from FIGS. 4 and 5 and as indicated in FIG. 2, in suitable positions along the length of a flange 31 some of the narrow slots 40 have a circular enlargement 52 for the passage of the shank of a bolt such as 53, FIG. 11. However, on the bolt, after it has passed through one flange 31 of one display plate 30, is threaded a washer 54 of adequate thickness before the bolt passes through the flange of the other plate 30. Subsequently, a nut 55 is fastened in position on the bolt to secure the parts together. This has the effect of leaving a long narrow gap or slot 56 between the plates which is suitable for the free passage of the cords 44 or bands 45. Such an arrangement is provided on all four sides of a plate 30 and it is thus possible to set up a display area of any required arrangement of plates so that some gaps 56 may be vertically arranged and others horizontally arranged. Further, it is of course possible to have the cords or bands arranged horizontally as shown in FIGS. 13, 14 and 15 of the drawings, or vertically. From the above it will be appreciated that the invention relates not only to a single display plate, but to an indicating system comprising a plurality of such plates joined together and with gaps between adjacent plates for the free movements of the cords or bands.

Apart from the whole of the above, it will be appreciated that the display surface of the plate 30 is not only for the display of the contrasting portions of cords, bands or the like, but for the reception of other indicating means, particularly indicating means which is held in position by pressure-sensitive adhesive on the rear surface thereof. As will be appreciated, such pressure-sensitive indicators can have a desired size relationship with the spacing and areas bounded by the lines of the grid. This enables an infinitely great variety of statistical or other information of divers forms, production charts, graphs and the like to be built up for a great variety of purposes and which can have co-ordinated therewith any suitable arrangement of the stretchable endless cords or bands.

Some of such indicators are shown in FIGS. 18 to 29. In FIG. 18, the flexible sheet material is of circular form, the circle having such a diameter that it can be accommodated in one of the small squares of the grid. In FIG. 19, there is an elongated indicator with rounded ends to be accommodated in two such small squares.

In FIG. 20 there is a square indicator of a size to cover the area of four small squares. FIG. 21 is a perspective view also of a square indicator, having a coating of pressure-sensitive adhesive on the rear. In this instance, however, one vertical edge is set round at an angle, which is not adhesive on the rear. This constitutes a "handle" 65 to be held between the first finger and the thumb, to simplify handling of the indicator. Other suitable indicators can be similarly formed. FIG. 22 shows an elongated rectangle forming an indicator substantially half an inch by one inch to cover eight such small squares.

It should be realised that all of these indicators can be made of any colour and, further, that a plurality thereof can be mounted upon a suitable carrying backing so that they simply have to be peeled off just prior to being adhered to the display surface of the plate 30 in the required position or positions.

FIG. 23 shows a variation of FIG. 20 but here the special feature is that there is an aperture in the centre of the indicator. FIG. 24 shows an example of where the indicator can carry an indicating character, the capital letter A being illustrated. Obviously, however, any other of the letters of the alphabet can be shown, either as capital letters or small letters. Further, these letters can be shown in any desired colouring. Again, in place of letters there may be numerals illustrated.

By this means it is possible to build up any required heading to a chart or the like, or any required side index or marking, as it is simply necessary to place the requisitely lettered or numbered indices side by side or one above the other to give the required built-up indication.

Again, and as shown in FIG. 25, the indicators are of the general shape and area shown in FIG. 22 but with specific indications thereon. For example, in FIG. 25 the contraction "JAN" is added for the month of January. Other indicators may have all of the other months.

In FIG. 26, again, the contraction for the day of the week "Monday" is shown and, of course, it is equally possible to have contractions for the other days of the week or for the months of the year.

Generally, such indicators having indicating markings thereon, may be made and sold in great variety, depending upon the particular purpose for which the chart or the like is to be used. For example, they may be well known contractions utilised in any particular industry or art.

A further important series of indicators of flexible material to be adhered by the provision of a pressure-sensitive adhesive backing, is where the indicators are in strip form. For example, they can be, say, three-sixteenths or one-quarter of an inch wide, or even wider, and provided in lengths or rolls. One portion of such is illustrated in FIG. 27 and it will be realised that such a strip can be placed horizontally across the whole of a plate 30 in any position, to give a horizontal bounding line in building up a chart or the like, or vertically in any desired position for a similar purpose. Again, such strips may be cut off in lengths before being adhered to the display surface, according to the purpose required.

Again, as shown in FIG. 3, an indicating strip 66, adhered to the plate 30, itself can have other indicators such as 67 adhered thereto, to carry out certain functions.

In a great variety of cases for the indication of line graphs and the like, especially when they are of a non-uniform character and are plotted from two factors, for example time and quantity, the indicator may be by an adhesive strip of narrow dimensions, for example one-sixteenth of an inch. A length of such a strip is shown in FIG. 28, and a portion 68 thereof shown at the left-hand lower corner of FIG. 16. Another portion 69, forming part of a "graph" is also shown in FIG. 3. When in great contrast to the surface of the display plate, it will be appreciated that such a graph is highly efficient, being extremely visible and well able to indicate its particular significance.

Apart from the above, such pressure-sensitive indicators may be of larger area and have outer surfaces of various colours, preferably tints rather than heavy colours, so that such surfaces may be written or typed upon to convey the necessary information. Such an example is shown in FIG. 29 which illustrates a rectangular indicator which measures, say, one inch by one and a half inches.

If FIG. 16 is inspected, allowing for the fact that it is drawn to half the scale of the indicators shown in FIGS. 18 to 29, it will be seen how such indicators can be mounted on the plate 30 in relation to the background grid-like marking thereof.

As the plate 30 is of metal, it may be of magnetic metal, for example steel, and in such a case it can be also utilised to hold in position indicators of a magnetic nature. For example, as shown in FIGS. 16 and 17, 57 is a small cylindrical magnet, for example of half-inch diameter and one-quarter inch axial length, and this can be mounted in any suitable position on the plate 30.

Its position may indicate a special purpose, or it may be mounted so that it can progress according to a certain scheme. For example, it can be progressed in a horizontal direction, and in order that the magnet shall not slip down by "jarring," for example due to the slamming of a door or the like, the magnet may ride on the outer edge of a strip such as 58, for example colourless and transparent, located on the plate 30 by pressure-sensitive adhesive.

Another type of indicator which can be utilised on the plate is one comprising a channel member extending from side to side thereof or from top to bottom thereof. Such a channel member can be of transparent plastic material and can be held in position by a pressure-sensitive adhesive on the rear thereof. Such a channel member is illustrated by 59 disposed at the lower right-hand portion of FIG. 16. Here, as will be appreciated, the rear part of the channel is adhered in position to the plate 30, leaving the channel portion 60 open to receive detachable indicators such as 61 of strip or card form. Obviously, the channel member 59 need not be short, as illustrated, but can have any desired length. Moreover, it should be appreciated that any desired number, even a great number, of such channel members may be mounted upon the surface of the plate 30, for any particular indicating purpose, and further that such channel members with the indicators carried thereby, alone, can be utilised for the display purpose, or such channel members with or without other adhesive indicators and/or endless cords or bands.

In some cases, in place of such transparent plastic channel members being held in position by adhesion, they can carry on their rear suitably shaped flat magnets which are held in position by being disposed on the display surface of the plate 30 when it is of magnetic metal. Such a construction is indicated in FIG. 30 where 62 is the channel member to receive the indicators such as 63 and which has attached on its rear towards the ends, flat magnets 64 which, although shown rectangular, can be circular or of other shape. Such a construction is shown in position towards the right-hand bottom corner of FIG. 16.

What I claim is:

1. An indicating device comprising a rectangular metal plate having an outer surface which forms the display surface of the indicating device, a grid marking on said outer surface consisting of uniformly spaced lines parallel with the sides of the rectangular plate, a rearwardly extending integral flange along each bounding edge of said plate, said flange being provided with a plurality of uniformly spaced narrow parallel slots corresponding to the spacing of said grid lines, the slots extending from the rear edge of each of said flanges in a direction toward the plate and being formed to extend alternately short and long distances toward said plate, the slots of greater length terminating at their inner ends in rectangular apertures extending at right angles to and at the central position of one of the longer sides of such rectangular apertures, the other longer sides of the rectangular apertures in their central position having a narrow notch constituting the end of the narrow slots, the whole forming a single constructional member, each of said rectangular apertures having a width slightly greater than the width of a stretchable narrow band-like indicating member to be stretched around and encircle the flanged plate and be received in said slots a depth greater than the thickness of said encircling member, and each of said narrow slots having a width slightly greater than the width of an endless stretchable indicating member to be stretched around and encircle the flanged plate and at a depth much greater than the thickness of such encircling member.

2. An indicating device as set forth in claim 1 in which the rear edge portions of each rearwardly extending integral and slotted flange is removed for a short length from each corner to reduce the width of the flange at these locations while the remaining portion of each rearwardly extending integral and slotted flange is formed with an integral auxiliary flange bent inwardly to lie in a plane parallel with the plate.

References Cited in the file of this patent

UNITED STATES PATENTS

| | | |
|---|---|---|
| 842,495 | Rose | Jan. 29, 1907 |
| 923,937 | Bernst | June 8, 1909 |
| 1,790,127 | Whitcomb | Jan. 27, 1931 |
| 1,793,767 | Whitcomb | Feb. 24, 1931 |
| 2,275,313 | Perenyi | Mar. 3, 1942 |
| 2,488,338 | Senegas | Nov. 15, 1949 |